United States Patent [19]

Keys

[11] Patent Number: 4,892,663

[45] Date of Patent: Jan. 9, 1990

[54] COAL FILTRATION PROCESS AND DEWATERING AIDS THEREFOR

[75] Inventor: Robert O. Keys, Columbus, Ohio

[73] Assignee: Sherex Chemical Company, Inc., Dublin, Ohio

[21] Appl. No.: 279,423

[22] Filed: Dec. 2, 1988

[51] Int. Cl.$^4$ ............................................. B01D 37/02
[52] U.S. Cl. ...................................... 210/729; 209/5; 210/736; 210/778
[58] Field of Search ............ 209/5; 210/725, 727-729, 210/778

[56] References Cited

U.S. PATENT DOCUMENTS

| | | | |
|---|---|---|---|
| 2,236,930 | 4/1941 | Uytenbogaart | 210/729 |
| 2,862,880 | 12/1958 | Clemens | 210/728 |
| 3,408,293 | 10/1968 | Dajani | 210/727 |
| 4,097,390 | 6/1978 | Wang et al. | 252/60 |
| 4,146,473 | 3/1979 | Edelmann et al. | 210/728 |
| 4,156,649 | 5/1979 | Quinn et al. | 210/51 |
| 4,206,063 | 6/1980 | Wang et al. | 252/60 |
| 4,207,186 | 6/1980 | Wang et al. | 210/54 |
| 4,323,365 | 4/1982 | Crosby et al. | 210/710 |
| 4,370,272 | 1/1983 | Wechsler et al. | 260/404 |

OTHER PUBLICATIONS

Comparative Study of the Vacuum Filtration Behavior of Iron Ore Concentrate Slurries, Sastry et al., Mining Engineering, Oct. 1983.

Dewatering Encyclopedia of Chemical Technology, 1984, pp. 310-339.

The Use of Flocculants and Surfactants in the Filtration of Mineral Slurries Pearse et al., Allied Colloids, Filtration and Separation, Jan./Feb. 1983, pp. 22-27.

Keller et al., "Surface Phenomena in the Dewatering of Coal", DOE Report No. FE-9001-1 (EPA-600/7-7-9-008), DOE Contract No. ET-75-G-01-9001 (Jan. 1979).

Chemical Dewatering Aids for Mineral and Coal Slurries, Purdy, American Cyanimic Co. pp. 261-269.

Thickening and Filtration Techniques for Dewatering Iron-Bearing Minerals and Precipitates, Emmett, EIMCO Process Equipment Co. 1986, Iron Control Hydrometal Symposium.

Dewatering Agents in Coal Preparation, Blubaugh et al., Nalco Chemical Co.

*Primary Examiner*—Peter Hruskoci
*Attorney, Agent, or Firm*—Mueller and Smith

[57] ABSTRACT

Disclosed is a method for dewatering an aqueous slurry of solid coal particulates wherein a dewatering aid is added to the slurry followed by filtration thereof, preferably with vacuum augmentation. Selected quaternary ammonium dewatering aids of specific structure are disclosed.

3 Claims, No Drawings

COAL FILTRATION PROCESS AND DEWATERING AIDS THEREFOR

BACKGROUND OF THE INVENTION

The present invention relates to dewatering of aqueous slurries of solid coal particulates and more particularly to an improved filtration process and dewatering aids therefor.

The vast majority of mineral processing methods require that the valuable mineral constituent(s) be separated in aqueous slurry form. After separation, the various mineral values must be dewatered to enable further processing and/or for recycle of the water for economical and/or ecological reasons. Further economic justification for dewatering includes lowering of transportation costs; lowering of energy costs during filtration; and elimination of freezing of the concentrates in railroad cars, barges, silos, stockpiles, etc. Additionally, chemical dewatering in filters can range from about 3 to 25 times less expensive than thermal drying.

Most commercial liquid/solid separation is effected by a rotary (drum or disk) vacuum filtration system or by centrifugal dryers. Filtration often is insufficient to meet the residual water specification and must be supplemented by thermal drying. Drum filters have been described in the literature as a rotating drum covered with filter cloth which rotates with its lower portion immersed in a continuously fed bowl with vacuum being applied beneath the cloth causing solids to deposit as a cake while filtrate passes therethrough. As the drum rotates, the filter cake leaves the slurry and air is drawn therethrough in a dewatering step, often known as the drying step. Dewatering aids are known to be effective in such drying step of the process. Finally, the dewatered filter cake is discharged by a variety of techniques including blowing action, knives, belts, strings, or rollers. Pearse, et al., "The Use of Flocculants and Surfactants in the Filtration of Mineral Slurries", *Filtration Separation*, January/February, 1983.

Many variables influence filtration efficiency. For example, the cake properties have been reported to be a function of particle size and size distribution, shape, packing, and dimensions of the cake. Fluid properties have been reported to be a function of density and viscosity while interfacial properties have been reported to be a function of surface tension (gas/liquid) and interfacial tension (gas/liquid and gas/solid). Other reported variables include temperature and pressure gradient rate of displacement. Kirk-Othmer, *Encyclopedia of Chemical Technology*, 1984 Supplement, page 310 et seq. Any change in any one of the above variables results in an increase or decrease of the final moisture content of the recovered ore. For instance, by raising the temperature from 15° C. to 80° C., the water viscosity drops by a factor of three and, consequently, the flow rate of water through the cake theoretically is tripled. Occasionally, steam is used to increase filtration rate on drum filters based on such viscosity phenomenon.

In coal, for example, four different types of water have been reported. These types of water include bulk water, capillary water, surface water, and inherent moisture. Bulk water is the water phase in an ore particle slurry or suspension. Particles in close proximity define capillary voids which retain water, i.e. capillary water. A thin sheath of water surrounding a particle due to surface wetting and water adhesion is known as surface water. Finally, moisture is retained in the fine pore structure of the coal and is known as inherent moisture. Blubaugh, et al., "Dewatering Agents in Coal Preparation", Nalco Chemical Company, Reprint 30.

Two distinct classes of chemicals are available for improving filtration properties of mineral ore slurries. The first class comprises flocculant "filter aids". These compounds are mostly linear, long-chain, water-soluble anionic or nonionic polymers based on polyacrylamide. The polymers bridge individual fine particles giving multi-particle aggregates. The aggregates have greater permeability, allowing for faster flow of water through the cake. These larger aggregates also assist in preventing filter cloth blinding by extremely fine particles. The second reported class of chemical filtration additives comprise surfactant "dewatering aids". The surfactants most often are heteropolar molecules composed of hydrophylic and hydrophobic groups. Commercially, sulfosuccinates are the most widely used surfactant dewatering aid. U.S. Pat. No. 4,156,649 reports the use of ethoxylated linear or branched alcohols as surfactant dewatering acids. U.S. Pat. Nos. 4,206,063 and 4,207,186 add a $C_8$–$C_{18}$ hydrophobic alcohol to an ethoxylated linear branched alcohol as a dewatering aid.

Theories of surfactant action in dewatering contexts include the surfactants concentration at the liquid/air interface resulting in reduction of surface tension, thus allowing filter cake capillaries to drain more readily; or their adsorption on solid surfaces with their hydrophobic group oriented towards the aqueous phase, thus rendering the ore particle surfaces more hydrophobic, i.e. more willing to shed the surface water. Pearse, et al., supra; Fall, et al., "Influence of Energy in Filter Cake Dewatering", *Aufbereitungs-Technik*, No. 3/1987, pp. 115–125; and Purdy, "Chemical Dewatering Aids for Mineral and Coal Slurries", Symposium Chemical Reagents in the Mineral Processing Industry, February, 1987. Both theories have validity and have been justified by results reported in the literature. However, each theory has its drawback and at various stages of the filtration process, each will have its dominant role. For example, the reduction of surface tension tends to be important at the onset of the dewatering cycle while increased hydrophobicity tends to dominate towards the end of the dewatering cycle.

Complicating the foregoing are additional factors, such as cracking of the filter cake, bubbles in the filter cake, etc. The elimination of these factors improve filtration efficiency. The thickness of the filter cake (pickup) influences not only the capacity but the resulting residual moisture. Surfactants can affect these variables positively or negatively.

In the dewatering of aqueous slurries of solid coal particles, a variety of amine compounds have been proposed in the art for use as dewatering aids (Brookes, "Zeta Potential Contact Angle and the Use of Amines in the Chemical Dewatering of Froth-Floated Coal", *Powder Technology*, 49 (1984) 207–214). Various amines proposed include, for example, oleyl amine, oleyl diamine, $C_{15}$–$C_{18}$ primary amines, secondary $C_{13}$–$C_{15}$ saturated amines, ethoxylated amines and diamines, and oleyl amine acetates. Purdy, "Chemical Dewatering Aid for Mineral and Coal Slurries", *Chemical Reagents in the Mineral Processing Industry*, Society of Mining Engineers, Inc., 1986 Symposium at Littleton, Colo., Chapter 28, states that he ". . . is not aware of cationic surfactants in commercial use in mineral filtration . . . " (at page 264). Curiously, however, U.S. Pat. No.

4,370,272 asserts that a specific dimethyl monoamido ester quaternary ammonium compound is suitable for use in the dewatering of coal. No data or other substantiation of this assertion is contained in the patent.

BROAD STATEMENT OF THE INVENTION

The present invention is directed to a dewatering aid which functions unexpectedly efficiently in the dewatering of a coal particulate solids slurry wherein a dewatering aid is added thereto followed by filtration of the slurry. Such improved dewatering results are achieved by adding to the solid coal particulate aqueous slurry, an effective amount of a dewatering aid selected from the group consisting of:

(a) a monoalkyl trimethyl quaternary ammonium compound of the structure:

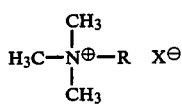

(b) a dialkyl dimethyl quaternary ammonium compound of the structure:

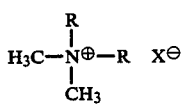

(c) a monomethyl trialkyl quaternary ammonium compound of the structure:

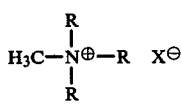

(d) a dimethyl alkyl benzyl quaternary ammonium compound of the structure:

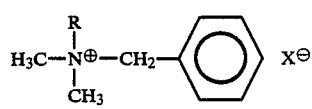

(e) a diquaternary ammonium compound of the structure:

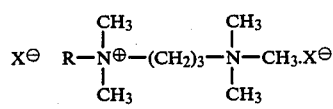

(f) an imidazolinium quaternary ammonium compound of the structure:

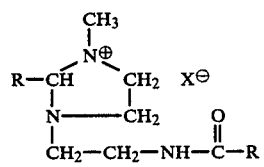

(g) a diamido monohydroxyalkyl quaternary ammonium compound of the structure:

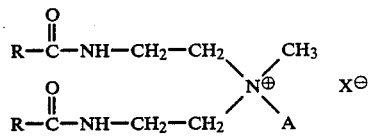

(h) a monomethyl di(hydroxyalkyl) quaternary ammonium compound of the structure:

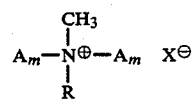

where:
each R independently is a $C_8$–$C_{22}$ alkyl group,
A is a 2-hydroxyethyl or 2-hydroxypropyl group;
$X^-$ is the anionic residue of an alkylating agent, and m is 1–50,
and mixtures thereof. The dewatering aids preferably are devoid of ester groups and of aromatic nitrogen atoms.

Advantages of the present invention include the ability to improve the dewatering of aqueous coal particulate solids slurries. Another advantage is the filtration efficiency imparted by the dewatering aids of the present invention, i.e. the time required to achieve a final water content. A further advantage is the ability to effectively and efficiently manufacture dewatering aids of the present invention quite economically. These and other advantages will be readily apparent to those skilled in the art based upon the disclosure contained herein.

DETAILED DESCRIPTION OF THE INVENTION

The invention is based upon the unexpected discovery that certain quaternary ammonium compounds provide excellent dewatering performance when used as a dewatering aid for aqueous slurries of solid coal particulates. Remarkably, not only is the final moisture content less by virtue of the presence of the quaternary ammonium dewatering aids, but the time to achieve water removal from the coal cake (filter efficiency) is dramatically reduced compared to the dewatering process without any dewatering aid. With respect to the ester quaternary ammonium compounds proffered as dewatering aids in U.S. Pat. No. 4,370,272, the particular dewatering aids of the present invention possess improved hydrolytic stability by the omission of the ester group and are based upon raw materials which provide a significant cost advantage in their production. The proportion of the quaternary ammonium dewatering aid utilized ranges from between about 0.05 and 1 pounds per ton of coal being dewatered, which further contributes to the economies and efficiencies of the inventive process.

In synthesizing the quaternary ammonium dewatering aids of the present invention, typically a tertiary amine (and on occasion a secondary amine) is subjected to reaction with an alkylating agent in conventional fashion. The alkylating agent, and corresponding anion of the quaternary ammonium dewatering agents, comprises a chloride, methyl sulfate, ethyl sulfate, dimethyl sulfate, or other conventional anionic moiety as those in the art will appreciate. Traditionally, alkylating agents utilize short chain alkyl groups for efficiencies in the alkylating reaction as well as for their cost advantages. The art does, however, teach a variety of special alkylating agents, often in combination with a variety of catalysts which can be used during the quaternization reaction. With respect to the tertiary amine being alkylated, the basic tertiary amine can be seen from the structures described above without the $C_1$–$C_6$ alkylating group. The alkylation reaction typically is conducted at a reaction temperature ranging from about 90° to 110° C. and 60–90 psig at reaction times ranging from about 1 to 10 hours or more. Known catalyst, e.g. sodium hydroxide or the like, is added in conventional fashion.

Particularly preferred alkylating agents for use in the dewatering process of the present invention include, for example, tallow trimethyl ammonium chloride, coco trimethyl ammonium chloride, undecyl trimethyl ammonium chloride, dihydrogenated tallow dimethyl ammonium chloride, ditallow dimethyl ammonium chloride, diisostearyl hexadecyl dimethyl ammonium chloride, didecyl dimethyl ammonium chloride, dioctyl dimethyl ammonium chloride, methyl tri($C_8$–$C_{10}$) ammonium chloride, dimethy($C_{12}$–$C_{16}$) benzyl ammonium chloride, N-tallow pentamethyl propane diammonium chloride, methyl-1-tallow amido ethyl-2-tallow imidazolinium methyl sulfate, methyl bis(tallow amido ethyl) 2-2-hydroxyethyl ammonium methyl sulfate, methyl bis(tallow amido ethyl) 2-hydroxypropyl ammonium methyl sulfate, methyl bis(2-hydroxyethyl) coco ammonium chloride, and the like and mixtures thereof.

Aqueous solid coal particulate slurries generally comprise a solids content ranging from between about 10 and 60%, with the balance being water. Impurities and the like also may be contained in the solids content of the slurries. The particle size of the solid coal particulates typically range from microns up to inches in size with particle distribution being a function of the coal processing. The dewatering aid is intimately mixed with the slurry which then is sent to filtration, typically augmented by the application of a vacuum for improving the dewatering kinetics.

The following examples show how the present invention has been practiced, but should no be construed as limiting. In this application, all citations are expressly incorporated herein by reference.

EXAMPLES

Example 1

Water (200 g) was added to Virginia coal (100 g) and thoroughly blended for one minute to produce aqueous slurries containing about 33% by weight of coal particles which were less than about 28 mesh in size (U.S. Standard Sieves Series). To the samples was added the appropriate dosage of the dewatering agent and the sample agitated for about 20 seconds. Thereafter, the slurry samples were poured into a Buchner funnel (11 cm) containing Whitman No. 1 filter paper. A vacuum of 15 in. Hg was applied and the time recorded from the beginning of the vacuum filtrate operation until all visibly evident excess water was removed. Filtration then was continued for one additional minute.

The filter cake then was dumped from a Buchner funnel onto a towel and transferred to a balance for determining moist weight. The filter cake then was dried in an oven at 100° C. and the dry weight recorded. The difference between the wet weight and the dry weight indicated the residual moisture of the filter cake. The dosage level of quaternary ammonium dewatering agent tested in this example was 0.5 lb/ton of coal particles subjected to the dewatering process. Room temperature prevailed in all operations. The following data was recorded:

| Dewatering Agent | Time for Excess Water Removal (seconds) | Wt % Moisture |
|---|---|---|
| Control* (No dewatering agent) | 53 | 24.9 |
| Tallow Trimethyl Ammonium Chloride | 27 | 19.8 |
| Coco Trimethyl Ammonium Chloride | 30 | 21.0 |
| Undecyl Trimethyl Ammonium Chloride | 35 | 21.8 |
| Dihydrogenated-Tallow Dimethyl Ammonium Chloride | 30 | 21.1 |
| Ditallow Dimethyl Ammonium Chloride | 25 | 19.1 |
| Diisostearyl (Branched $C_{16}$) Dimethyl Ammonium Chloride | 25 | 19.9 |
| Didecyl Dimethyl Ammonium Chloride | 27 | 20.4 |
| Dioctyl Dimethyl Ammonium Chloride | 35 | 21.8 |
| Methyl Tri ($C_8$–$C_{10}$) Ammonium Chloride | 32 | 20.5 |
| Dimethyl Alkyl ($C_{12}$–$C_{16}$) Benzyl Ammonium Chloride | 30 | 20.9 |
| N Tallow Pentamethyl Propane Diammonium Chloride | 28 | 20.0 |
| Methyl-1-tallowamidoethyl 2-tallow imidazolinium-methyl sulfate | 26.5 | 19.8 |
| Methyl bis (tallowamidoethyl) 2-hydroxyethyl ammonium methyl sulfate | 28.5 | 20.6 |
| Methyl bis (tallowamidoethyl) 2-hydroxypropyl ammonium methyl sulfate | 28 | 20.4 |
| Methyl bis (2-hydroxyethyl) coco ammonium chloride | 32 | 21.8 |

*Average two tests

The above-tabulated results clearly demonstrate the improvement which the dewatering agents of the present invention provide in removing more moisture than is removed in their absence. Importantly, also, this data shows that the filter efficiency, i.e. time to achieve excess water removal, is dramatically reduced by using the inventive dewatering agents. Finally, a wide variety from all classes of quaternary ammonium dewatering agents disclosed herein are demonstrated above.

Example 2

Utilizing the procedure described in connection with Example 1, a variety of comparative dewatering agents were tested and compared to ditallow dimethyl ammonium chloride dewatering agent of the present invention. The dosage levels and final moisture content of the filter cake used for the various dewatering agents are set forth in the following table.

TABLE 2

| DEWATERING COAL | | |
|---|---|---|
| Dewatering Agent | Dosage (lb/ton) | % Moisture |
| Control | — | 23.7 |
| Comparative | | |
| Dioctyl Sulfosuccinate | .6 | 22.6 |
| Tri ($C_8$–$C_{10}$) Amine | .6 | 21.6 |
| Oleyl Amine | .6 | 22.8 |
| Oleyl Diamine | .6 | 19.5 |
| Isodecyl Ether Amine | .6 | 20.0 |
| Isooctyl Ether Amine | .6 | 19.5 |
| Tridecyl Ether Diamine | .6 | 19.6 |
| Oleyl Diamine | .6 | 18.3 |
| Oleyl Diamine | .3 | 19.4 |
| Oleyl Diamine | .15 | 21.0 |
| Di Tridecyl Amine | .6 | 22.5 |
| Inventive | | |
| Ditallow Dimethyl Ammonium Chloride | .6 | 18.35 |
| Ditallow Dimethyl Ammonium Chloride | .3 | 18.5 |

TABLE 2-continued
DEWATERING COAL

| Dewatering Agent | Dosage (lb/ton) | % Moisture |
|---|---|---|
| Ditallow Dimethyl Ammonium Chloride | .15 | 20.3 |

The foregoing data demonstrates that quaternary ammonium dewatering agents of the present invention function more efficiency than the tested comparative dewatering agents at equivalent dosage levels.

I claim:

1. In a method for dewatering an aqueous slurry of solid coal particulates wherein the aqueous slurry contains between about 10 and 60 percent of solid coal particulates and a dewatering aid is added to said slurry followed by vacuum filtration thereof to produce a filter cake of said coal particulates, the improvement for lowering the water content of said filter cake which comprises adding to said slurry prior to filtration an effective amount of a dewatering aid selected from the group consisting of:

(a) a monoalkyl trimethyl quaternary ammonium compound of the structure:

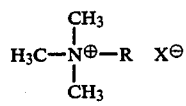

(b) a dialkyl dimethyl quaternary ammonium compound of the structure:

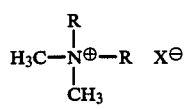

(c) a monomethyl trialkyl quaternary ammonium compound of the structure:

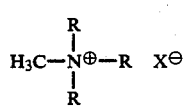

(d) a dimethyl alkyl benzyl quaternary ammonium compound of the structure:

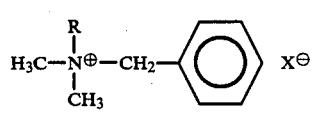

(e) a diquaternary ammonium compound of the structure:

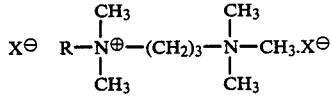

(f) an imidazolinium quaternary ammonium compound of the structure:

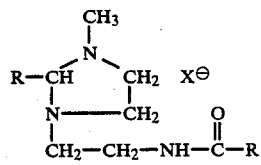

(g) a diamido monohydroxyalkyl quaternary ammonium compound of the structure:

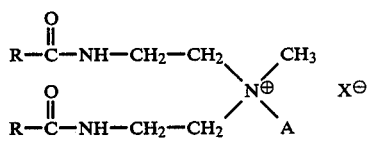

(h) a monomethyl di(hydroxyalkyl) quaternary ammonium compound of the structure:

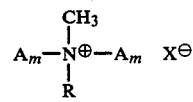

where:
each R independently is a $C_8$–$C_{22}$ alkyl group,
A is a 2-hydroxyethyl or 2-hydroxypropyl group;
$X^\ominus$ is the anionic residue of an alkylating agent, and m is 1–50,
and mixtures thereof.

2. The method of claim 1 wherein said dewatering aid is selected from the group consisting of tallow trimethyl ammonium chloride, coco trimethyl ammonium chloride, undecyl trimethyl ammonium chloride, dihydrogenated tallow dimethyl ammonium chloride, ditallow dimethyl ammonium chloride, diisotearyl hexadecyl dimethyl ammonium chloride, didecyl dimethyl ammonium chloride, dioctyl dimethyl ammonium chloride, methyl tri($C_8$–$C_{10}$) ammonium chloride, dimethyl ($C_{12}$–$C_{16}$) benzyl ammonium chloride, N-tallow pentamethyl propane diammonium chloride, methyl-1-tallow amido ethyl-2-tallow imidazolinium methyl sulfate, methyl bis(tallow amido ethyl) 2-2-hydroxyethyl ammonium methyl sulfate, methyl bis(tallow amido ethyl) 2-hydroxypropyl ammonium methyl sulfate, methyl bis(2-hydroxyethyl) coco ammonium chloride, and mixtures thereof.

3. The method of claim 1 wherein the effective amount of said dewatering aid added to said slurry is between about 0.05 and 1 pound per ton of coal particulates.

* * * * *